United States Patent
Shapira (10) Patent No.: US 9,059,821 B2
(45) Date of Patent: Jun. 16, 2015

(54) CARRIER GROUPING SCHEMES FOR WIRELESS LOCAL AREA NETWORKS

(75) Inventor: Nir Shapira, Ra'anana (IL)

(73) Assignee: CELENO COMMUNICATIONS (ISRAEL) LTD., Ra'anana (IL)

( * ) Notice: Subject to any disclaimer, the term of this patent is extended or adjusted under 35 U.S.C. 154(b) by 371 days.

(21) Appl. No.: 13/562,323

(22) Filed: Jul. 31, 2012

(65) Prior Publication Data

US 2013/0034003 A1 Feb. 7, 2013

Related U.S. Application Data

(60) Provisional application No. 61/514,069, filed on Aug. 2, 2011.

(51) Int. Cl.
H04L 1/00 (2006.01)
H04W 16/28 (2009.01)
H04B 7/06 (2006.01)

(52) U.S. Cl.
CPC ............. *H04L 1/0027* (2013.01); *H04W 16/28* (2013.01); *H04B 7/0619* (2013.01); *H04L 1/0026* (2013.01)

(58) Field of Classification Search
CPC ... H04L 1/0027; H04L 1/0026; H04W 16/28; H04B 7/0619
See application file for complete search history.

(56) References Cited

U.S. PATENT DOCUMENTS

| | | | | |
|---|---|---|---|---|
| 7,286,855 | B2 * | 10/2007 | Raleigh et al. | 455/562.1 |
| 2003/0087673 | A1 * | 5/2003 | Walton et al. | 455/562 |
| 2003/0128658 | A1 * | 7/2003 | Walton et al. | 370/208 |
| 2005/0111599 | A1 * | 5/2005 | Walton et al. | 375/347 |
| 2007/0298742 | A1 * | 12/2007 | Ketchum et al. | 455/186.1 |
| 2010/0271992 | A1 * | 10/2010 | Wentink et al. | 370/310 |
| 2010/0316163 | A1 * | 12/2010 | Forenza et al. | 375/296 |
| 2011/0002371 | A1 * | 1/2011 | Forenza et al. | 375/227 |
| 2011/0003608 | A1 * | 1/2011 | Forenza et al. | 455/501 |
| 2011/0243025 | A1 * | 10/2011 | Kim et al. | 370/252 |

OTHER PUBLICATIONS

P802.11ad-D11, titled IEEE P802.11ad™/D1.1; Draft Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 5:published Jun. 2010, p. 01-406.*

P802.11ad-D11, titled IEEE P802.11ad™/D1.1; Draft Standard for Information Technology—Telecommunications and Information Exchange Between Systems—Local and Metropolitan Area Networks—Part 11: Wireless LAN Medium Access Control (MAC) and Physical Layer (PHY) Specifications—Amendment 5,published Jun. 2010.*

(Continued)

*Primary Examiner* — Andrew Lai
*Assistant Examiner* — Hoyet H Andrews, III
(74) *Attorney, Agent, or Firm* — D. Kligler I.P. Services Ltd.

(57) ABSTRACT

A method in a receiver includes receiving from a transmitter a request to provide channel feedback relating to a communication channel between the transmitter and the receiver. A maximum latency after which the channel feedback is expected by the transmitter is assessed. A spectral resolution with which to calculate the channel feedback is selected based on the assessed maximum latency. The channel feedback is calculated with the selected spectral resolution, and the calculated channel feedback is sent to the transmitter within the maximum latency.

48 Claims, 2 Drawing Sheets

(56) References Cited

OTHER PUBLICATIONS

IEEE Standard 802.11n, IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput, 539 pages, New York, USA, Oct. 29, 2009.

IEEE Standard 802.11ac/D2.0, "IEEE Draft Standard for IT—Telecommunications and Information Exchange Between Systems—LAN/MAN—Specific Requirements—Part 11: Wireless LAN Medium Access Control and Physical Layer Specifications; Amendment 4: Enhancements for Very High Throughput for operation in bands below 6GHz", 359 pages, New York, USA, Jan. 2012.

* cited by examiner

CARRIER GROUPING SCHEMES FOR WIRELESS LOCAL AREA NETWORKS

CROSS-REFERENCE TO RELATED APPLICATIONS

This application claims the benefit of U.S. Provisional Patent Application 61/514,069, filed Aug. 2, 2011, whose disclosure is incorporated herein by reference.

FIELD OF THE INVENTION

The present invention relates generally to wireless communication, and particularly to methods and systems for providing channel feedback in wireless communication systems.

BACKGROUND OF THE INVENTION

Some wireless communication systems employ channel feedback schemes, in which transmitters configure their transmissions to receivers based on channel feedback provided by the receivers. For example, channel feedback schemes for Wireless Local Area Networks (WLAN) are defined in the IEEE 802.11n standard, entitled IEEE Standard for Information Technology—Telecommunications and Information Exchange between Systems—Local and Metropolitan Area Networks—Specific Requirements; Part 11: Wireless LAN Medium Access Control (MAC) and Physical Layer (PHY) Specifications; Amendment 5: Enhancements for Higher Throughput, "October, 2009; and in the IEEE 802.11ac standard, entitled IEEE Draft Standard for IT—Telecommunications and Information Exchange Between Systems—LAN/MAN—Specific Requirements—Part 11: Wireless LAN Medium Access Control and Physical Layer Specifications—Amd: Enhancements for Very High Throughput for operation in bands below 6 GHz," January, 2012, which are incorporated herein by reference.

SUMMARY OF THE INVENTION

An embodiment of the present invention that is described herein provides a method, which includes receiving in a receiver from a transmitter a request to provide channel feedback relating to a communication channel between the transmitter and the receiver. A maximum latency after which the channel feedback is expected by the transmitter is assessed. A spectral resolution with which to calculate the channel feedback is selected based on the assessed maximum latency. The channel feedback is calculated with the selected spectral resolution, and the calculated channel feedback is sent to the transmitter within the maximum latency.

In some embodiments, receiving the request includes receiving an order in which multiple receivers, including the receiver, are to provide the channel feedback, and assessing the maximum latency includes identifying a position of the receiver in the order. In an embodiment, identifying the position includes verifying whether the receiver appears first in the order.

In a disclosed embodiment, the method includes notifying the transmitter of one or more spectral resolutions that are supported by the receiver, before receiving the request to provide the channel feedback. In another embodiment, the method includes receiving multiple carriers distributed over frequency over which to calculate the channel feedback, and selecting the spectral resolution includes selecting a subset of the carriers, having a selected inter-carrier frequency spacing, so as to calculate the channel feedback only over the carriers in the subset. In yet another embodiment, selecting the spectral resolution includes receiving from the transmitter a notification of a coarsest allowed spectral resolution, and choosing the spectral resolution so as to comply with the coarsest allowed spectral resolution.

There is additionally provided, in accordance with an embodiment of the present invention, a method in a transmitter that transmits to multiple receivers. The method includes assessing respective spectral resolutions with which the receivers are capable of providing channel feedback to the transmitter. A group that includes two or more of the receivers is formed based on the assessed spectral resolutions. The transmitter transmits jointly to the receivers in the group.

In some embodiments, forming the group includes selecting, based on the assessed spectral resolutions, the receivers to be included in a Multi-User (MU) group, and transmitting jointly to the receivers in the group includes transmitting beamformed transmissions simultaneously to the receivers in the MU group. Forming the group may include selecting only receivers that support spectral resolutions finer than a threshold.

In an embodiment, forming the group includes forming a sounding group whose receivers are requested by the transmitter to provide the channel feedback sequentially, and defining, based on the assessed spectral resolutions, an order in which the transmitter requests the receivers in the sounding group to provide the channel feedback. In another embodiment, forming the group includes forming a sounding group whose receivers are requested by the transmitter to provide the channel feedback sequentially, and assigning to the receivers in the sounding group, based on the assessed spectral resolutions, respective maximum latencies with which to provide the channel feedback.

In yet another embodiment, assessing the spectral resolutions includes receiving messages from the receivers in which the receivers publish the spectral resolutions with which the receivers are capable of providing the channel feedback. In an alternative embodiment, assessing the spectral resolutions includes receiving feedback messages from the receivers, and deducing the spectral resolutions with which the receivers are capable of providing the channel feedback from the received feedback messages. In an embodiment, assessing the spectral resolutions includes determining spectral resolution capabilities of a given receiver for at least first and second different latencies of providing the channel feedback.

In still another embodiment, assessing the spectral resolutions includes assessing inter-carrier frequency spacing values supported by the receivers in calculating the channel feedback over a signal including multiple carriers distributed over frequency. Assessing the spectral resolutions may include notifying the receivers of a coarsest spectral resolution that is allowed by the transmitter.

There is also provided, in accordance with an embodiment of the present invention, a method in a transmitter that transmits to multiple receivers. The method includes defining a full set of spectral resolutions with which the receivers are permitted to provide channel feedback to the transmitter, and a partial subset of the full set. A criterion relating to a given receiver is evaluated. Based on the evaluated criterion, the given receiver is instructed whether to select the spectral resolution from the full set or from the partial subset.

In some embodiments, evaluating the criterion includes assessing a position of the given receiver in an order in which the receivers are requested to provide the channel feedback. In an embodiment, evaluating the criterion includes assessing a latency with which the given receiver is requested to provide the channel feedback. In another embodiment, evaluating the criterion includes assessing a number of antennas of the given receiver. In a disclosed embodiment, a coarsest spectral resolution in the partial subset is finer than the coarsest spectral resolution in the full set.

In another embodiment, defining the partial subset includes specifying the partial subset for all the receivers, or individually for each of the receivers, or for each group of the receivers that is requested jointly to provide channel feedback to the transmitter. In an embodiment, instructing the given receiver includes sending to the given receiver a single signaling bit, which specifies whether to select the spectral resolution from the full set or from the partial subset.

There is further provided, in accordance with an embodiment of the present invention, apparatus including a transceiver and a processor. The transceiver is configured to receive from a transmitter a request to provide channel feedback relating to a communication channel between the transmitter and the apparatus, and to transmit the channel feedback to the transmitter. The processor is configured to assess a maximum latency after which the channel feedback is expected by the transmitter, to select, based on the assessed maximum latency, a spectral resolution with which to calculate the channel feedback, and to calculate the channel feedback with the selected spectral resolution so as to provide the calculated channel feedback within the maximum latency.

There is further provided, in accordance with an embodiment of the present invention, apparatus including a transceiver and a processor. The transceiver is configured to transmit to multiple receivers. The processor is configured to assess respective spectral resolutions with which the receivers are capable of providing channel feedback, to form, based on the assessed spectral resolutions, a group that includes two or more of the receivers, and to configure the transceiver to transmit jointly to the receivers in the group.

There is additionally provided, in accordance with an embodiment of the present invention, apparatus including a transceiver and a processor. The transceiver is configured to transmit to multiple receivers. The processor is configured to hold a definition of a set of spectral resolutions with which the receivers are permitted to provide channel feedback, and of a partial subset of the full set, to evaluate a criterion relating to a given receiver, and, based on the evaluated criterion, to instruct the given receiver via the transceiver whether to select the spectral resolution from the full set or from the partial subset.

The present invention will be more fully understood from the following detailed description of the embodiments thereof, taken together with the drawings in which:

DETAILED DESCRIPTION OF EMBODIMENTS

Overview

In some communication systems, a transmitter transmits a directional transmission beam toward a receiver using beamforming. The transmitter typically configures the beamforming operation based on feedback from the receiver regarding the communication channel between them. In some communication systems, the transmitter transmits multiple beamformed transmissions to multiple respective receivers simultaneously, a technique that is commonly referred to as Spatial Division Multiple Access (SDMA) or Multi-User Multiple-Input Multiple-Output (MU-MIMO).

A given receiver may calculate and report its channel feedback to the transmitter at various spectral resolutions. For example, when using Orthogonal Frequency Division Multiplexing (OFDM), the receiver may calculate and report the channel feedback at various carrier increments, e.g., for every carrier, every second carrier or every fourth carrier of the OFDM symbol. This technique is referred to as carrier grouping.

Channel feedback with fine spectral resolution will typically improve the beamforming accuracy, and as a result reduce interference in SDMA applications. On the other hand, calculating and reporting channel feedback at fine spectral resolution incurs a large number of computations, and increases the latency in providing the feedback as well as the feedback overhead. Different choices of spectral resolution therefore result in different performance trade-offs.

Embodiments of the present invention that are described herein provide improved methods and systems for providing channel feedback in communication systems that employ beamforming.

In some embodiments, the receivers indicate their carrier grouping capabilities to the transmitter, either explicitly or implicitly. The transmitter uses this information to form one or more groups of receivers, and transmits jointly to the receivers in each group.

In some embodiments, the transmitter uses the carrier grouping capabilities of the receivers to choose which receivers to group together in a Multi-User (MU) group, to which the transmitter transmits simultaneously using SDMA. In other embodiments, the transmitter forms a sounding group whose receivers are requested to provide their respective channel feedback sequentially. In these embodiments, the transmitter may use the carrier grouping capabilities of the receivers to set the order in which the receivers in the sounding group are requested to provide their channel feedback. For example, the first receiver in the sounding group has the most severe latency constraint in providing its channel feedback, and therefore receivers that use coarse spectral resolution (and thus small latency) may be placed first in the order. As a result, the system is able to meet its latency requirements without degrading the feedback accuracy.

In other embodiments, a given receiver assesses the maximum latency with which it is expected to provide the channel feedback to the transmitter. The receiver then chooses the spectral resolution with which to calculate and report the channel feedback, so as to meet the maximum allowed latency. For example, when the transmitter announces the order in which the receivers in a given MU group are expected to provide their channel feedback, a given receiver may choose the spectral resolution based on its relative position in the announced order. For example, the first receiver in the order may choose a relatively coarse spectral resolution in order to meet the latency constraints. The other receivers typically have more relaxed latency constraints, and may therefore choose a finer spectral resolution having better accuracy.

In other disclosed embodiments, the transmitter and the receivers support a certain predefined set of spectral resolutions for the channel feedback. The transmitter defines a partial subset of this set, and restricts one or more of the receivers to use the partial subset. The transmitter may choose whether or not to restrict a certain receiver to the partial subset based on various criteria, such as the receiver's position in the above-described order or the number of receive antennas in the receiver. In some cases the transmitter can deduce the number of receive antennas from the maximum number of spatial streams supported by the receiver.

Various examples of channel feedback calculation and reporting schemes, using the disclosed techniques, are described herein. The embodiments described herein refer mainly to OFDM-based Wireless Local Area Networks (WLANs) that operate in accordance with the IEEE 802.11n or 802.11ac standards. The disclosed techniques, however, can also be used in any other suitable communication system.

System Description

Figure 1:
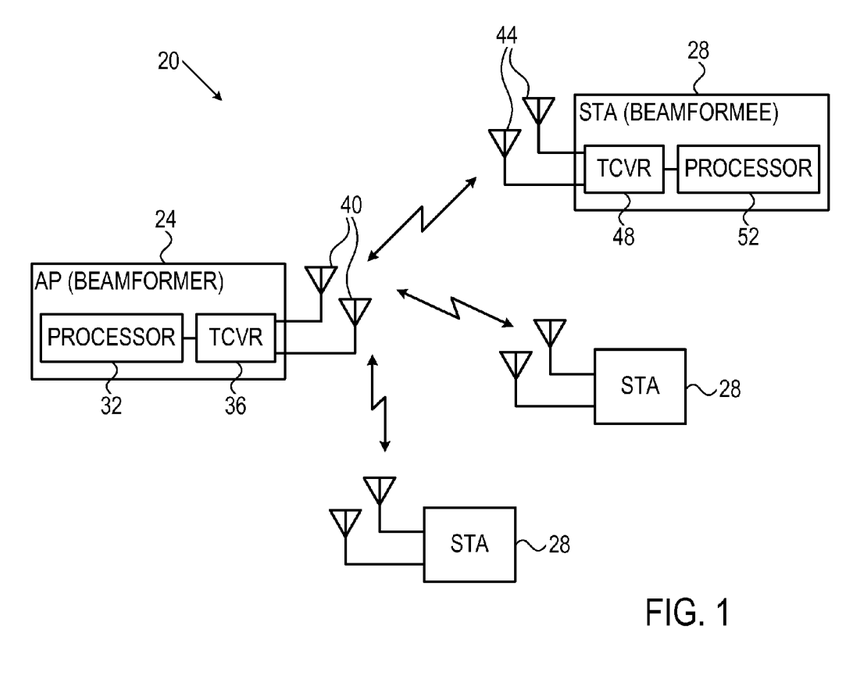
FIG. 1 is a block diagram that schematically illustrates a wireless communication system, in accordance with an embodiment of the present invention.

FIG. 1 is a block diagram that schematically illustrates a wireless communication system 20, in accordance with an embodiment of the present invention. In the present example, system 20 comprises a Wireless Local Area Network (WLAN) that operates in accordance with the IEEE 802.11n or 802.11ac specification, cited above. In alternative embodiments, however, system 20 may operate in accordance with any other suitable wireless communication protocol.

System 20 comprises an Access Point (AP) 24 that communicates with multiple stations (STAs) 28. STAs 28 may comprise any suitable WLAN-enabled devices. AP 24 comprises a transceiver (TCVR) 36 that communicates with the STAs over the WLAN, and a processor 32 that manages the AP operation and also performs various higher-level protocol functions. In particular, processor 32 carries out grouping of STAs into Multi-User (MU) groups and handles channel feedback schemes, as will be explained in detail below. AP 24 transmits and receives RF signals via an array of two or more antennas 40.

Each STA 28 comprises one or more antennas 44, a TCVR 48 that communicates with AP 24 over the WLAN, and a processor 52 that manages the STA operation and performs various higher-level protocol functions. In particular, processor 52 formulates channel feedback for transmission to the AP, as will be described in detail below.

The configuration of system 20 shown in FIG. 1 is an example configuration, which is chosen purely for the sake of conceptual clarity. In alternative embodiments, any other suitable system configuration can be used. Some elements of system 20 may be implemented in hardware, e.g., in one or more Application-Specific Integrated Circuits (ASICs) or Field-Programmable Gate Arrays (FPGAs). Additionally or alternatively, some elements of system 20, such as processors 32 and 52, can be implemented using software, or using a combination of hardware and software elements.

Some of the functions of system 20, such as some or all of the functions of processors 32 and 52, may be carried out using one or more general-purpose processors, which are programmed in software to carry out the functions described herein. The software may be downloaded to the processors in electronic form, over a network, for example, or it may, alternatively or additionally, be provided and/or stored on non-transitory tangible media, such as magnetic, optical, or electronic memory.

In the present example, TCVR 36 of AP 24 transmits to STAs 28 signals that are modulated using Orthogonal Frequency Division Multiplexing (OFDM). The AP transmission typically comprises a sequence of OFDM symbols, each symbol comprising multiple modulated OFDM carriers that are distributed over a certain bandwidth.

AP 24 typically applies beamforming to the signals transmitted to the STAs. When transmitting to a given STA, TCVR 36 applies a set of complex weights to the respective antennas 40, so as to produce a directional transmission beam that is directed toward the desired STA. Thus, the AP is sometimes referred to herein as a beamformer, and the STAs are sometimes referred to herein as beamformees.

The set of weights used for transmission to a given STA is typically represented as a beamforming matrix. Typically, processor 32 of AP 24 computes the beamforming matrix based on channel feedback (sometimes referred to as Channel State Information—CSI) provided by the STA.

In some embodiments, AP 24 transmits multiple transmissions simultaneously to multiple STAs 28 using Spatial Division Multiple Access (SDMA). In this mode of operation, the AP typically defines a group of STAs that is referred to as a Multi-User (MU) group, and collects channel feedback from the various STAs in the group. Based on the channel feedback, the AP computes a set of beamforming matrices for the respective STAs in the group, and transmits signals to the STAs in the group simultaneously based on the respective beamforming matrices. The AP may form a single MU group, or it may form multiple groups and transmit using SDMA to each group at a time.

In order to compute the beamforming matrices, AP 24 and STAs 28 typically carry out a sounding process in which the AP transmits a sounding signal to a group of STAs, which is referred to herein as a sounding group. (The grouping of STAs into sounding groups is typically different from the grouping into MU groups for the purposes of SDMA. Each type of grouping is managed using different signaling mechanisms.) The STAs in a given sounding group measure the sounding signal and estimate the channel, and then transmit the resulting CSI to the AP sequentially. The AP subsequently uses the CSI provided by the STAs for computing the appropriate beamforming matrices.

Figure 2:
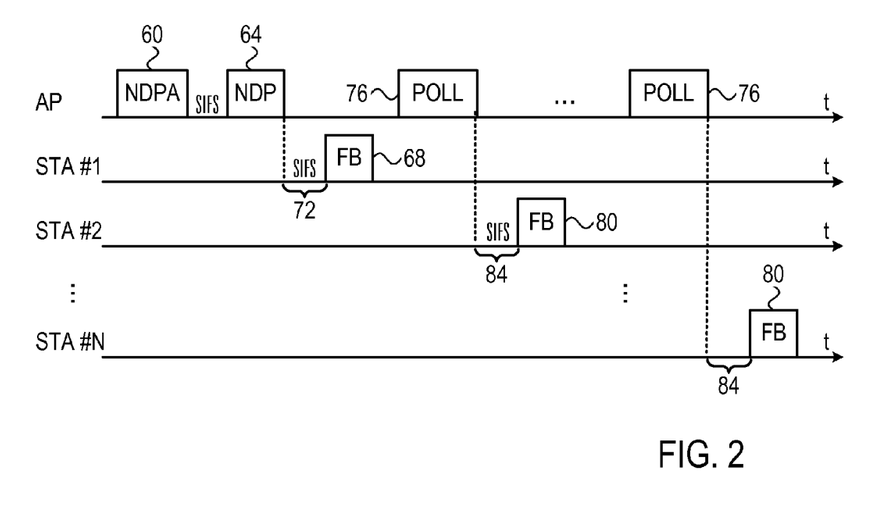
FIG. 2 is a diagram that schematically illustrates a multi-user channel sounding process, in accordance with an embodiment of the present invention.

FIG. 2 is a diagram that schematically illustrates a multi-user channel sounding process, in accordance with an embodiment of the present invention. The process is carried out by AP 24 and a group of N STAs 28 denoted STA#1 . . . STA#N, which have been chosen by the AP to be included in a sounding group.

The process begins with AP 24 transmitting a Null Data Packet Announcement (NDPA) frame 60 followed by a Null Data Packet (NDP) frame 64. Frames 60 and 64 are separated by a Short Inter-Frame Space (SIFS) interval. NDPA frame 60 comprises a list of the STAs that are included in the sounding group. The list is ordered, i.e., specifies the order in which the STAs in the sounding group are requested to provide their channel feedback. NDP frame 64 comprises a sounding signal that is measured by the STAs in order to estimate the channel response and compute their respective channel feedback.

The first STA on the list, in the present example STA#1, is expected to provide its channel feedback after a SIFS interval 72. In IEEE 802.11ac, interval 72 is sixteen microseconds long. Thus, STA#1 sends a feedback (FB) frame 68 to AP 24 following SIFS interval 72. The FB frame comprises the channel feedback that STA#1 has computed based on its measurement of the NDP frame.

The other STAs on the list are requested to provide their feedback using poll frames. In the present example, AP 24 sends poll frames 76 to STA#2 . . . STA#N, and each STA sends a respective FB frame 80 to the AP following a SIFS interval 84.

Once the FB frame from the last STA is received, the AP has obtained the channel feedback information from all N STAs in the sounding group. Processor 32 in the AP uses the channel feedback information to compute beamforming matrices for transmitting to the N STAs in the group.

Carrier Grouping and Associated Trade-Offs

In various embodiments, STAs 24 may compute and report their channel feedback at various spectral resolutions. For example, an STA may calculate and report the channel feedback for each individual carrier of the OFDM signal. Alternatively, an STA may calculate and report the channel feedback for every second carrier, for every fourth carrier or at any other reduced resolution. In such cases, the AP may determine the channel feedback for the other carriers of the OFDM signal using interpolation or other means.

The latter technique is referred to as carrier grouping or tone grouping. The degree of carrier grouping is typically expressed using a parameter denoted Ng, which specifies the carrier separation between carriers for which the STA provides channel feedback. For example, Ng=4 means that the STA computes and reports channel feedback for every fourth carrier in the OFDM signal. Ng=1 means that the STA computes and reports channel feedback at full spectral resolution, i.e., for every single carrier.

(In the present patent application, the terms "high spectral resolution" and "large spectral resolution" refer to fine spectral resolution, e.g., small Ng. By the same token, the terms "low spectral resolution" and "small spectral resolution" refer to coarse spectral resolution, e.g., large Ng. The terms "maximal spectral resolution" and "minimal spectral resolution" refer to finest and coarsest spectral resolutions, respectively.)

The value of Ng has considerable impact on system performance, and the choice of Ng thus provides various performance trade-offs. For example, reducing Ng will typically improve the accuracy of the channel feedback, and thus the accuracy of the beamforming matrices used by the AP. This accuracy is particularly important in SDMA configurations (especially in high-signal-to-noise-ratio scenarios), in which beamforming inaccuracies result in interference to the STAs from transmissions intended to other STAs.

On the other hand, when using small Ng, the STA has more information to compute and report to the AP. Reducing Ng will typically increase the computational complexity of feedback calculation at the STA, as well as the latency in providing the feedback to the AP. Increasing Ng will typically degrade the feedback accuracy, but on the other hand reduce computational complexity and latency in the STA.

The impact of Ng on computational complexity is particularly strong since some feedback reporting scenarios have strict time constraints. In the sounding process of FIG. 2, for example, the first STA in the MU group is required to provide its feedback sixteen microseconds after receiving the NDP sounding frame.

It is often advantageous to allow each STA to select its own Ng value, rather than having the AP dictate the Ng values to the STAs, since the STA is usually better aware of its own implementation limitations. Nevertheless, it is beneficial to at least notify the AP in advance of the NG values, or ranges of values, used by the various STAs. The AP may take this information into account, for example in deciding which STAs to group together in a MU group.

MU Grouping Based on Carrier Grouping Capabilities Published by STAs

In some embodiments that are described herein, STAs publish their carrier grouping capabilities, or otherwise make their carrier grouping capabilities known to AP 24 before being requested by the AP to provide channel feedback. Processor 32 in the AP uses this information to select which STAs to group together in a MU group, and/or how to order the STAs in a sounding group.

Figure 3:
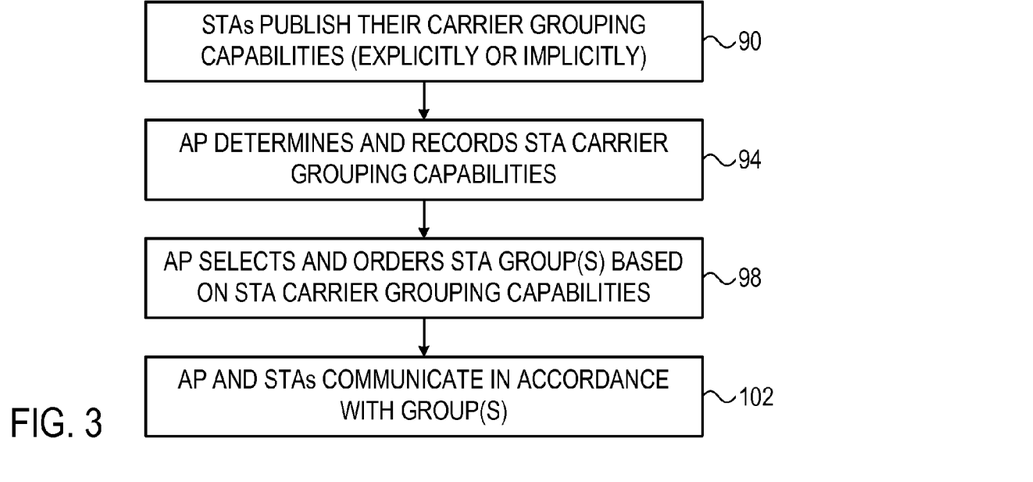
FIG. 3 is a flow chart that schematically illustrates a method for multi-user communication, in accordance with an embodiment of the present invention.

FIG. 3 is a flow chart that schematically illustrates a method for multi-user communication, in accordance with an embodiment of the present invention. The method begins with STAs 28 publishing their carrier grouping capabilities, at a capability publishing step 90. A given STA may publish its capabilities, for example, by reporting to the AP an Ng value or range of values that are supported by the STA. Publishing the capabilities may be performed explicitly or implicitly, as will be described below.

Processor 32 in AP 24 determines and records the carrier grouping capabilities of the various STAs, at a capabilities recording step 94. Based on the published carrier grouping capabilities, processor 32 in the AP decides which STAs to group together in a MU group, and/or how to order the STAs within a sounding group, at an STA grouping step 98. The AP may form one or more MU groups and/or sounding groups in this manner. The AP may also decide, for example, that a certain STA is not to be included in any MU group, and the AP will transit to that STA without using SDMA.

In a typical embodiment, processor 32 may select an STA that uses large Ng (and therefore small latency) and place it as the first STA in a sounding group. As noted above with regard to FIG. 2, the first STA in the sounding group has strict time constraints in providing its channel feedback to the AP, while the other STAs in the sounding group have much more relaxed latency requirements. Thus, choosing an STA that uses large Ng to be the first STA in the sounding group will help to meet the latency requirements.

In another embodiment, the AP includes in an MU group only STAs that support spectral resolutions finer than a certain threshold. Additionally or alternatively, processor 32 in AP 24 may use any other suitable criteria for choosing which STAs to include in a MU group and/or how to order the STAs in a sounding group.

AP 24 and STAs 28 communicate with one another in accordance with the above-decided grouping, at a communication step 102. In particular, the AP and the STAs in each group carry out the channel sounding process of FIG. 2 above.

A given STA 28 may publish its carrier aggregation capabilities in various ways. For example, the IEEE 802.11ac specification, cited above, defines a Very High Throughput (VHT) Capabilities Information Element that can be used for this purpose.

In an example embodiment the STA publishes its minimum supported Ng. In some embodiments, this published Ng value is considered and used only when using MU sounding as in FIG. 2 above, and disregarded when using Single-User (SU) transmission.

In some embodiments, the STA publishes two minimal Ng values—One minimal Ng value for severely time-constrained scenarios (e.g., for the case where the STA is the first to provide channel feedback in the sounding process of FIG. 2), and another minimal Ng value for more relaxed scenarios (e.g., for the case where the STA is not first).

Processor 32 in AP 24 may use the published carrier grouping capabilities of STAs 28 in various ways. For example, processor 32 may use the two minimal Ng values published by each STA in making STA grouping decisions. In one embodiment, processor 32 chooses to place an STA that published a small Ng value for its short-delay capability as the first in a sounding group, and place other STAs, which have published small Ng only as their large-delay capability, further down the list.

In some embodiments, processor 32 may use this policy even when the STAs do not publish their Ng capabilities explicitly. For example, processor 32 may deduce the STA Ng capabilities by sounding each STA once as the first STA in the sounding group (i.e., first on the list in the NDPA frame) and once as a later STA in the sounding group. From observing the Ng values that are actually used by the STA in each case, processor 32 can learn the Ng selection capabilities of the STA.

In some embodiments, a given STA will use the exact Ng values it has published. In other embodiments, the published Ng values are used as an indication of capabilities to assist the AP in making decisions, but the STA may deviate from the published values (typically use higher Ng) when calculating and providing its channel feedback.

In some embodiments, AP 24 publishes its maximum allowed (or recommended) Ng value for MU (SDMA) operation (i.e., the coarsest allowed spectral resolution). A given STA may consider this value when publishing its minimum supported Ng values. For example, the STA may choose to publish a minimum supported Ng value that does not exceed the maximum allowed Ng value published by the AP. The STA may publish this NG value in one or both of the published Ng capabilities (for each feedback delay option—in cases where Ng per delay is supported).

In some embodiments the maximum allowed (or recommended) Ng value published by AP 24 may apply to a particular sounding group, or for each STA. In the former case, the AP may transmit the maximum allowed Ng value in NDPA frame 60 that precedes the NDP frame 64 addressed to this sounding group (FIG. 2). The published Ng value will then apply to all the STAs that are sounded using this NDP frame. In the latter case, the AP may publish its maximum allowed Ng value per STA as part of the information carried in STA list in NDPA frame 60.

Carrier Grouping in STAs Based on Feedback Latency Constraints

In some embodiments, processor 52 in a given STA 28 assesses the maximum latency after which it is expected to provide channel feedback to AP 24. Based on the assessed maximum latency, processor 52 selects the spectral resolution (e.g., Ng) for calculating and reporting the channel feedback.

In an example embodiment, when the STA in question is part of a group of STAs that is sounded by the AP in accordance with the scheme of FIG. 2, processor 52 may select the Ng value based on the relative position of the STA on the list. For example, processor 52 may choose a large Ng value (having a reduced number of computations and small latency) when the STA is the first on the list, and a smaller Ng value (having higher latency) otherwise.

Figure 4:
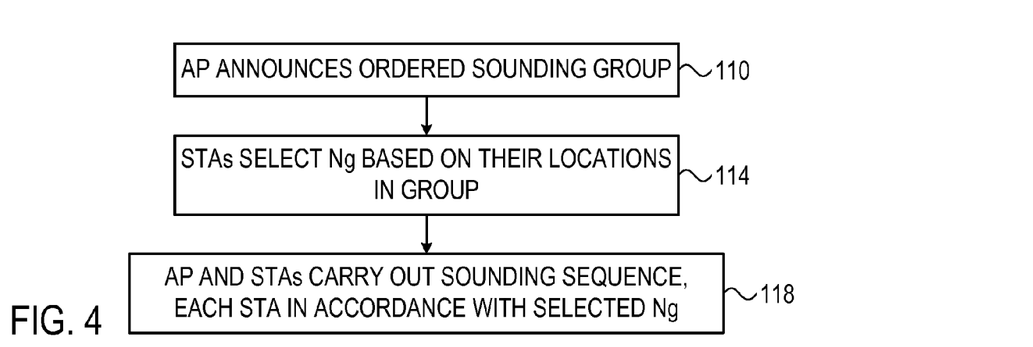
FIGS. 4 and 5 are flow charts that schematically illustrate methods for providing channel feedback, in accordance with embodiments of the present invention.

FIG. 4 is a flow chart that schematically illustrates a method for providing channel feedback, in accordance with an embodiment of the present invention. The method begins with AP 24 announcing an order of the STAs in a sounding group, at an order announcement step 110. The announcement may be performed, for example, by transmitting NDPA frame 60.

Each STA in the sounding group selects a respective Ng value based on the announced order, at an Ng selection step 114. The AP and STAs in the sounding group then carry out the MU channel sounding process of FIG. 2 in accordance with the selected Ng values, at a sounding step 118. The AP may then determine the MU group members and the appropriate beamforming matrices based on the channel feedback provided by the STAs, and transmit to the STAs in the MU group simultaneously using these beamforming matrices.

Selective Enforcing of Partial Subset of Supported Spectral Resolutions

Typically, system 20 supports a certain predefined set of spectral resolutions. In some embodiments, however, processor 32 of AP 24 may define a partial subset of the supported spectral resolutions, and instruct one or more of STAs 28 to use only the spectral resolutions in the partial subset instead of the full set.

For example, in accordance with the IEEE 802.11ac standard, the AP and STAs may choose Ng=1, Ng=2 or Ng=4. In some practical cases, the use of Ng=4 may be problematic for some STAs, while Ng=1 or Ng=2 is usually sufficient. Ng=4 may be problematic, for example, in terms of performance, because of the relatively coarse granularity of the channel feedback. Ng=1 may be problematic, for example, in terms of computational complexity and latency. Thus, in some embodiments processor 32 of AP 24 restricts some of STAs 28 to use only Ng=1 or Ng=2, and not Ng=4.

Processor 32 may use various criteria for choosing which STAs to restrict to the partial subset of supported Ng values. In one embodiment, the AP and STAs use the channel sounding process of FIG. 2 above. Processor 32 allows the first STA in the order announced in NDPA frame to select Ng from the full set Ng$\in\{1,2,4\}$, and restricts the other STAs (which respond to poll frames 76) to use the partial subset Ng$\in\{1,2\}$. In other words, the AP selects whether to restrict a certain STA to the partial subset of Ng depending on the latency with which this STA is requested to provide its channel feedback.

In another embodiment, processor 32 decides whether or not to restrict a given STA to the partial subset of Ng values based on the number of receive antennas of the STA. For example, processor 32 may define a certain threshold number of receive antennas denoted Nant, and restrict the STAs having less than Nant receive antennas to use the partial subset Ng$\in\{1,2\}$. The other STAs may use the full set Ng$\in\{1,2,4\}$. Processor 32 may enforce this criterion, for example, by notifying the STAs of the threshold value Nant.

The rationale behind this criterion is that for a small number of receive antennas (and respective processing channels), the STA will typically have no difficulty in meeting the computational complexity of small Ng. This criterion is especially useful for single-antenna STAs, for which the complexity of using any Ng is usually negligible.

(In some implementations the AP may have no direct knowledge of the number of STA receive antennas. Typically, however, the AP is aware of the maximum number of spatial streams supported by each STA. The maximum number of spatial streams is correlative to (usually equal to or slightly smaller than) the number of receive antennas. Thus, in order to evaluate the above criterion, in some embodiments the AP may deduce the number of STA receive antennas from the maximum number of spatial streams supported by the STA.)

In alternative embodiments, AP 24 may use any other suitable full set and partial subset of spectral resolutions, and any other suitable criterion for choosing which STAs to restrict to the partial subset.

Processor 32 of AP 24 may use various signaling mechanisms for carrying out the selective restriction of Ng values. In one embodiment, the air interface between the AP and STAs comprises a bit referred to as "Ng=4 allowed". Using this bit, the AP indicates to each STA whether the STA is permitted to use Ng∈{1,2,4}, or only Ng∈{1,2}. The AP may send this bit separately to each STA (e.g., based on the individual channel conditions of the STA), to all STAs (e.g., in the AP capabilities field), or to all the STAs in a given sounding group (e.g., in NDPA frame 60).

In some cases, an STA may be unable to comply with the selective restriction of Ng values instructed by the AP. For example, an STA that is instructed not to use Ng=4 may not be able to use Ng<4 with the required latency or due to some implementation restriction. In some embodiments, an STA that is unable to comply with the selective restriction of Ng values instructed by the AP may return an "unable to comply" message or zero feedback to the AP.

Figure 5:
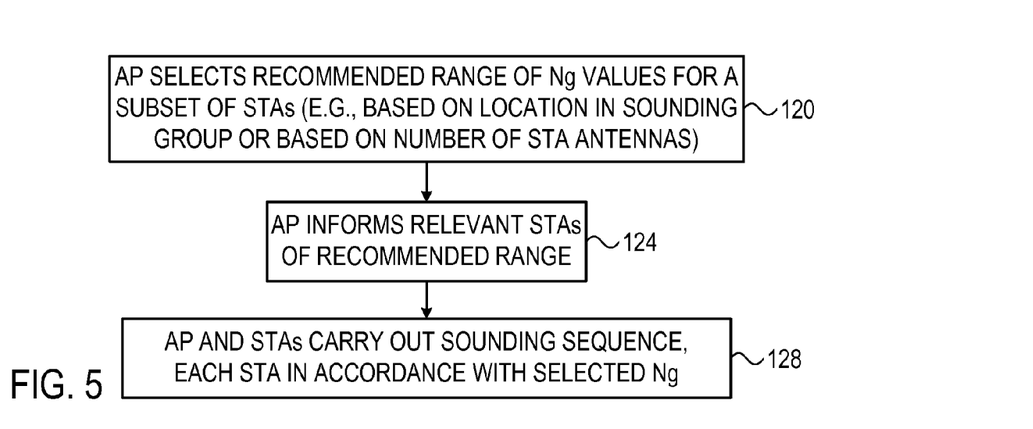

FIG. 5 is a flow chart that schematically illustrates a method for providing channel feedback, in accordance with an embodiment of the present invention. The method begins with processor 32 of AP 24 selecting for each STA 28 a recommended range of Ng values (either the full set or a partial subset of the supported Ng values), at a range selection step 120. Any selection criterion, such as the example criteria described above, can be used for this purpose.

AP 24 notifies STAs 28 of their assigned Ng value ranges, at a notification step 124. The AP and STAs then carry out the channel sounding process of FIG. 2, with each STA choosing its Ng value from its recommended range, at a sounding step 128.

It will be appreciated that the embodiments described above are cited by way of example, and that the present invention is not limited to what has been particularly shown and described hereinabove. Rather, the scope of the present invention includes both combinations and sub-combinations of the various features described hereinabove, as well as variations and modifications thereof which would occur to persons skilled in the art upon reading the foregoing description and which are not disclosed in the prior art. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

The invention claimed is:

1. A method, comprising:
   in a receiver, receiving from a transmitter a request to provide channel feedback relating to a communication channel between the transmitter and the receiver;
   assessing a maximum latency after which the channel feedback is expected by the transmitter;
   selecting, based on the assessed maximum latency, a spectral resolution with which to calculate the channel feedback; and
   calculating the channel feedback with the selected spectral resolution, and sending the calculated channel feedback to the transmitter within the maximum latency.

2. The method according to claim 1, wherein receiving the request comprises receiving an order in which multiple receivers, including the receiver, are to provide the channel feedback, and wherein assessing the maximum latency comprises identifying a position of the receiver in the order.

3. The method according to claim 2, wherein identifying the position comprises verifying whether the receiver appears first in the order.

4. The method according to claim 1, and comprising, before receiving the request to provide the channel feedback, notifying the transmitter of one or more spectral resolutions that are supported by the receiver.

5. The method according to claim 1, and comprising receiving multiple carriers distributed over frequency over which to calculate the channel feedback, wherein selecting the spectral resolution comprises selecting a subset of the carriers, having a selected inter-carrier frequency spacing, so as to calculate the channel feedback only over the carriers in the subset.

6. The method according to claim 1, wherein selecting the spectral resolution comprises receiving from the transmitter a notification of a coarsest allowed spectral resolution, and choosing the spectral resolution so as to comply with the coarsest allowed spectral resolution.

7. A method, comprising:
   in a transmitter that transmits to multiple receivers, assessing respective spectral resolutions with which the receivers are capable of providing channel feedback to the transmitter;
   based on the assessed spectral resolutions, forming a group that comprises two or more of the receivers; and
   transmitting from the transmitter jointly to the receivers in the group.

8. The method according to claim 7, wherein forming the group comprises selecting, based on the assessed spectral resolutions, the receivers to be included in a Multi-User (MU) group, and wherein transmitting jointly to the receivers in the group comprises transmitting beamformed transmissions simultaneously to the receivers in the MU group.

9. The method according to claim 8, wherein forming the group comprises selecting only receivers that support spectral resolutions finer than a threshold.

10. The method according to claim 7, wherein forming the group comprises forming a sounding group whose receivers are requested by the transmitter to provide the channel feedback sequentially, and defining, based on the assessed spectral resolutions, an order in which the transmitter requests the receivers in the sounding group to provide the channel feedback.

11. The method according to claim 7, wherein forming the group comprises forming a sounding group whose receivers are requested by the transmitter to provide the channel feedback sequentially, and assigning to the receivers in the sounding group, based on the assessed spectral resolutions, respective maximum latencies with which to provide the channel feedback.

12. The method according to claim 7, wherein assessing the spectral resolutions comprises receiving messages from the receivers in which the receivers publish the spectral resolutions with which the receivers are capable of providing channel feedback.

13. The method according to claim 7, wherein assessing the spectral resolutions comprises receiving feedback messages from the receivers, and deducing the spectral resolutions with which the receivers are capable of providing the channel feedback from the received feedback messages.

14. The method according to claim 7, wherein assessing the spectral resolutions comprises determining spectral resolution capabilities of a given receiver for at least first and second different latencies of providing the channel feedback.

15. The method according to claim 7, wherein assessing the spectral resolutions comprises assessing inter-carrier frequency spacing values supported by the receivers in calculating the channel feedback over a signal comprising multiple carriers distributed over frequency.

16. The method according to claim 7, wherein assessing the spectral resolutions comprises notifying the receivers of a coarsest spectral resolution that is allowed by the transmitter.

17. The method according to claim 7, wherein assessing the spectral resolutions comprises receiving messages from the receivers in which the receivers publish respective minimal spectral resolutions with which the receivers are capable of providing the channel feedback, and comprising forming the group of the receivers based on the published minimal spectral resolutions if performing Multi-User (MU) sounding, and ignoring the published minimal spectral resolutions if performing Single-User (SU) transmission.

18. A method, comprising:
in a transmitter that transmits to multiple receivers, defining a full set of spectral resolutions with which the receivers are permitted to provide channel feedback to the transmitter, and a partial subset of the full set;
evaluating a criterion relating to a given receiver; and
based on the evaluated criterion, instructing the given receiver whether to select the spectral resolution from the full set or from the partial subset.

19. The method according to claim 18, wherein evaluating the criterion comprises assessing a position of the given receiver in an order in which the receivers are requested to provide the channel feedback.

20. The method according to claim 18, wherein evaluating the criterion comprises assessing a latency with which the given receiver is requested to provide the channel feedback.

21. The method according to claim 18, wherein evaluating the criterion comprises assessing a number of antennas of the given receiver.

22. The method according to claim 18, wherein a coarsest spectral resolution in the partial subset is finer than the coarsest spectral resolution in the full set.

23. The method according to claim 18, wherein defining the partial subset comprises specifying the partial subset for all the receivers, or individually for each of the receivers, or for each group of the receivers that is requested jointly to provide channel feedback to the transmitter.

24. The method according to claim 18, wherein instructing the given receiver comprises sending to the given receiver a single signaling bit, which specifies whether to select the spectral resolution from the full set or from the partial subset.

25. Apparatus, comprising:
a transceiver, which is configured to receive from a transmitter a request to provide channel feedback relating to a communication channel between the transmitter and the apparatus, and to transmit the channel feedback to the transmitter; and
a processor, which is configured to assess a maximum latency after which the channel feedback is expected by the transmitter, to select, based on the assessed maximum latency, a spectral resolution with which to calculate the channel feedback, and to calculate the channel feedback with the selected spectral resolution so as to provide the calculated channel feedback within the maximum latency.

26. The apparatus according to claim 25, wherein the transceiver is configured to receive an order in which multiple transceivers, including the transceiver, are to provide the channel feedback, and wherein the processor is configured to assess the maximum latency by identifying a position of the transceiver in the order.

27. The apparatus according to claim 26, wherein the processor is configured to verify whether the transceiver appears first in the order.

28. The apparatus according to claim 25, wherein the processor is configured to notify the transmitter, before receiving the request to provide the channel feedback, of one or more spectral resolutions that are supported by the apparatus.

29. The apparatus according to claim 25, wherein the transceiver is configured to receive multiple carriers distributed over frequency over which to calculate the channel feedback, and wherein the processor is configured to select the spectral resolution by selecting a subset of the carriers, having a selected inter-carrier frequency spacing, so as to calculate the channel feedback only over the carriers in the subset.

30. The apparatus according to claim 25, wherein the transceiver is configured to receive from the transmitter a notification of a coarsest allowed spectral resolution, and wherein the processor is configured to choose the spectral resolution so as to comply with the coarsest allowed spectral resolution.

31. Apparatus, comprising:
a transceiver, which is configured to transmit to multiple receivers; and
a processor, which is configured to assess respective spectral resolutions with which the receivers are capable of providing channel feedback, to form, based on the assessed spectral resolutions, a group that comprises two or more of the receivers, and to configure the transceiver to transmit jointly to the receivers in the group.

32. The apparatus according to claim 31, wherein the processor is configured to select, based on the assessed spectral resolutions, the receivers to be included in a Multi-User (MU) group, and to transmit beamformed transmissions simultaneously to the receivers in the MU group.

33. The apparatus according to claim 32, wherein the processor is configured to select only receivers that support spectral resolutions finer than a threshold.

34. The apparatus according to claim 31, wherein the processor is configured to form a sounding group whose receivers are requested to provide the channel feedback sequentially, and to define, based on the assessed spectral resolutions, an order in which the receivers in the sounding group are requested to provide the channel feedback.

35. The apparatus according to claim 31, wherein the processor is configured to form a sounding group whose receivers are requested to provide the channel feedback sequentially, and to assign to the receivers in the sounding group, based on the assessed spectral resolutions, respective maximum latencies with which to provide the channel feedback.

36. The apparatus according to claim 31, wherein the transceiver is configured to receive messages from the receivers in which the receivers publish the spectral resolutions with which the receivers are capable of providing the channel feedback, and wherein the processor is configured to assess the spectral resolutions from the received messages.

37. The apparatus according to claim 31, wherein the transceiver is configured to receive feedback messages from the receivers, and wherein the processor is configured to deduce the spectral resolutions with which the receivers are capable of providing the channel feedback from the received feedback messages.

38. The apparatus according to claim 31, wherein the processor is configured to assess spectral resolution capabilities of a given receiver for at least first and second different latencies of providing the channel feedback.

39. The apparatus according to claim 31, wherein the processor is configured to assess the spectral resolutions by assessing inter-carrier frequency spacing values supported by the receivers in calculating the channel feedback over a signal comprising multiple carriers distributed over frequency.

40. The apparatus according to claim 31, wherein the processor is configured to notify the receivers of a coarsest allowed spectral resolution.

41. The apparatus according to claim 31, wherein the transceiver is configured to receive messages from the receivers in which the receivers publish respective minimal spectral resolutions with which the receivers are capable of providing the channel feedback, and wherein the processor is configured to form the group of the receivers based on the published minimal spectral resolutions if performing Multi-User (MU) sounding, and to ignore the published minimal spectral resolutions if performing Single-User (SU) transmission.

42. Apparatus, comprising:
a transceiver, which is configured to transmit to multiple receivers; and
a processor, which is configured to hold a definition of a full set of spectral resolutions with which the receivers are permitted to provide channel feedback, and of a partial subset of the full set, to evaluate a criterion relating to a given receiver, and, based on the evaluated criterion, to instruct the given receiver via the transceiver whether to select the spectral resolution from the full set or from the partial subset.

43. The apparatus according to claim 42, wherein the processor is configured to evaluate the criterion by assessing a position of the given receiver in an order in which the receivers are requested to provide the channel feedback.

44. The apparatus according to claim 42, wherein the processor is configured to evaluate the criterion by assessing a latency with which the given receiver is requested to provide the channel feedback.

45. The apparatus according to claim 42, wherein the processor is configured to evaluate the criterion by assessing a number of antennas of the given receiver.

46. The apparatus according to claim 42, wherein a coarsest spectral resolution in the partial subset is finer than the coarsest spectral resolution in the full set.

47. The apparatus according to claim 42, wherein the processor is configured to define the partial subset for all the receivers, or individually for each of the receivers, or for each group of the receivers that is requested jointly to provide channel feedback to the transmitter.

48. The apparatus according to claim 42, wherein the processor is configured to send to the given receiver a single signaling bit, which specifies whether to select the spectral resolution from the full set or from the partial subset.

* * * * *